United States Patent
Yasumura

(10) Patent No.: US 6,456,509 B1
(45) Date of Patent: Sep. 24, 2002

(54) POWER LOSS OF SWITCHING POWER SUPPLY CIRCUIT FOR SUPPLYING CONSTANT VOLTAGE

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/925,921

(22) Filed: Aug. 9, 2001

(30) Foreign Application Priority Data

Aug. 16, 2000 (JP) ........................................ 2000-253012

(51) Int. Cl.[7] .............................................. H02M 3/335
(52) U.S. Cl. ....................................... 363/21.02; 363/44
(58) Field of Search ........................ 363/15, 20, 21.02, 363/39, 44, 84, 125, 127

(56) References Cited

U.S. PATENT DOCUMENTS

| | | | | |
|---|---|---|---|---|
| 6,262,897 B1 | * | 7/2001 | Yasumura | 363/21.02 |
| 6,317,337 B1 | * | 11/2001 | Yasumura | 363/21.04 |
| 6,324,081 B1 | * | 11/2001 | Sakamoto et al. | 363/25 |
| 6,339,262 B1 | * | 1/2002 | Igarashi et al. | 307/39 |
| 6,341,075 B2 | * | 1/2002 | Yasumura | 363/21.2 |
| 6,349,046 B2 | * | 2/2002 | Yasumura | 363/21.02 |
| 6,356,465 B2 | * | 3/2002 | Yasumura | 363/21.02 |
| 6,366,476 B1 | * | 4/2002 | Yasumura | 363/21.02 |
| 6,370,041 B2 | * | 4/2002 | Yasumura | 363/19 |
| 6,370,043 B1 | * | 4/2002 | Yasumura | 363/21.02 |

* cited by examiner

Primary Examiner—Adolf Deneke Berhane
(74) Attorney, Agent, or Firm—Jay H. Maioli

(57) ABSTRACT

A direct-current output voltage obtained by rectifying an alternating voltage generated in a secondary winding of an isolating converter transformer PIT is made constant using an active clamp circuit including an auxiliary switching device, a clamp capacitor, and a clamp diode connected in parallel with a parallel resonant capacitor supplied with the alternating voltage to step down and-make constant the direct-current output voltage without using a three-terminal regulator and a chopper regulator. A control circuit effects PWM control of the auxiliary switching device of the active clamp circuit and changes a capacitance of the parallel resonant capacitor. The direct-current output voltage is made constant, and a resulting power loss is reduced.

6 Claims, 9 Drawing Sheets

FIG. 3
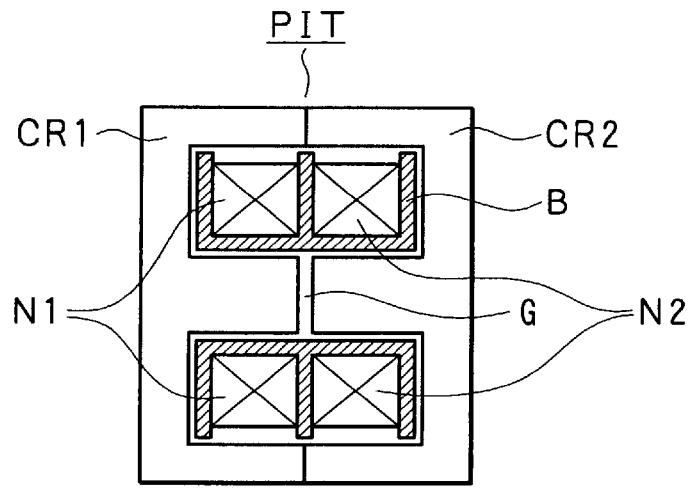
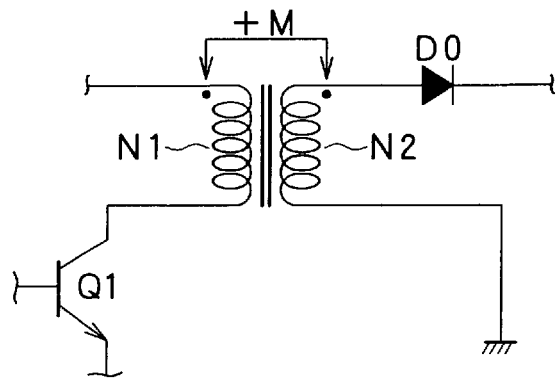
FIG. 4A
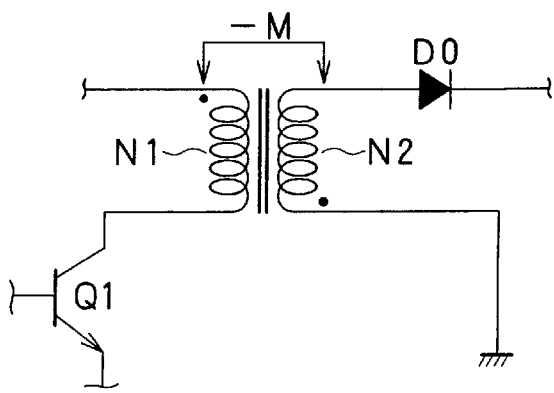
FIG. 4B

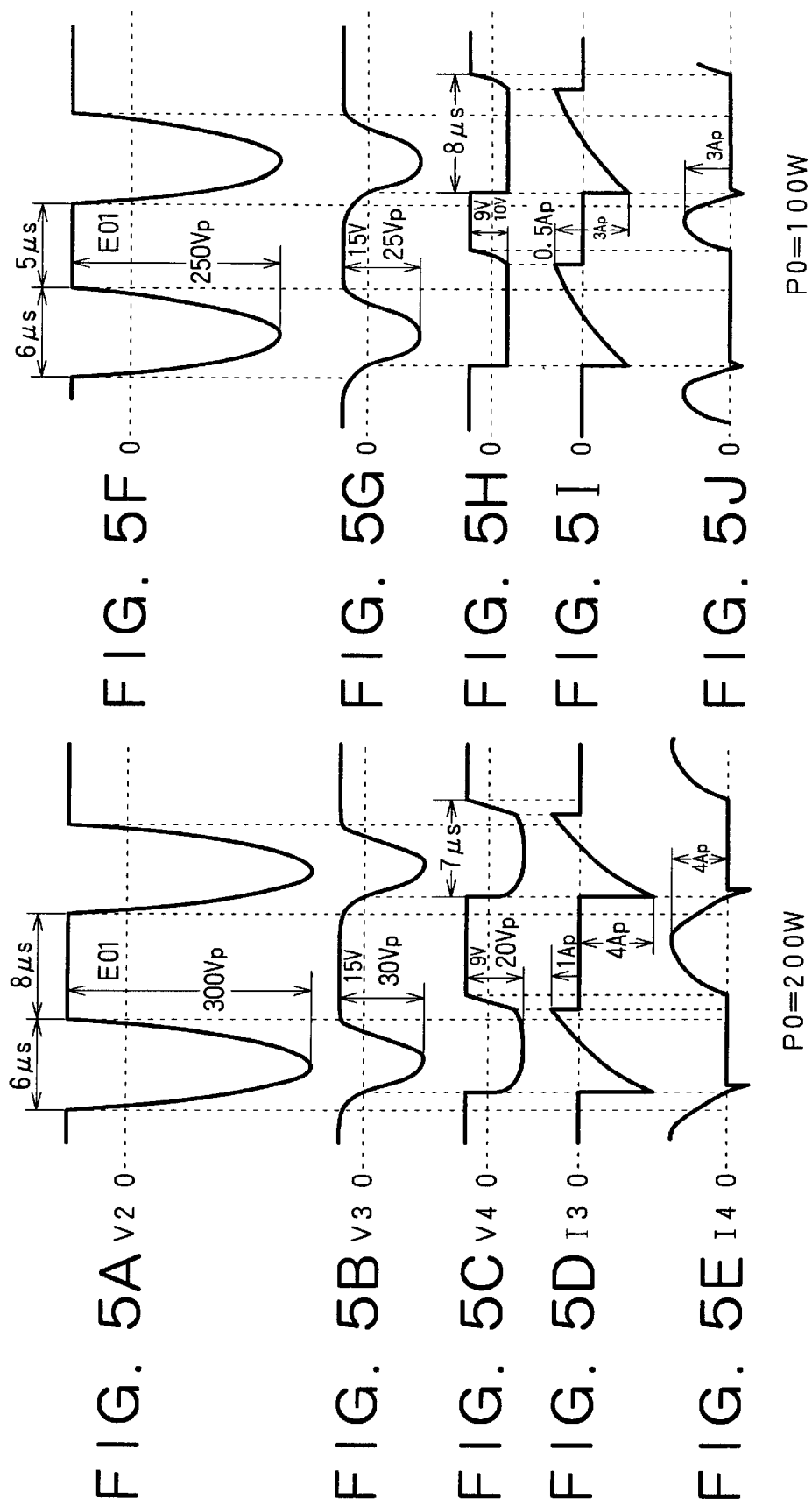

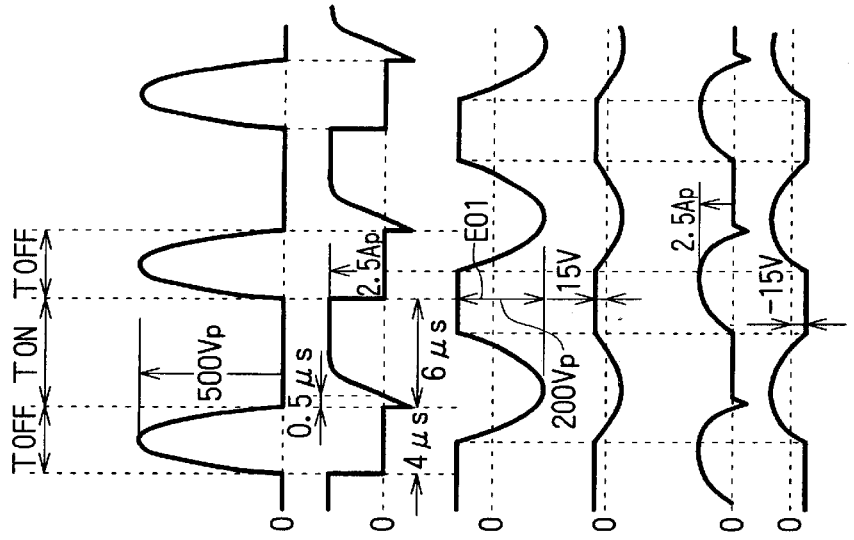
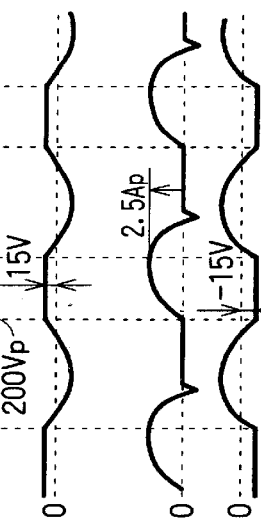
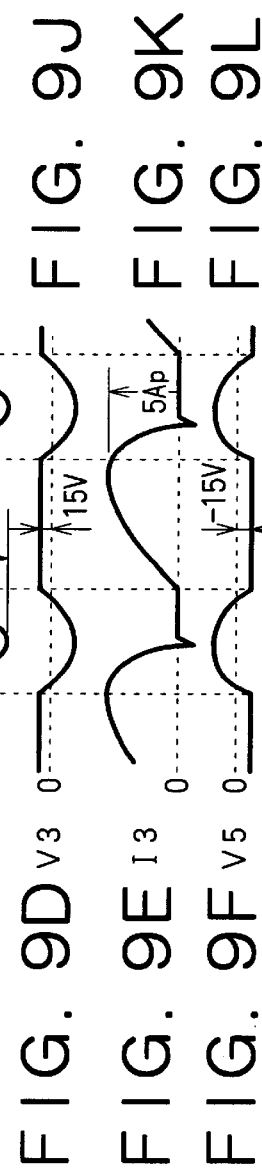
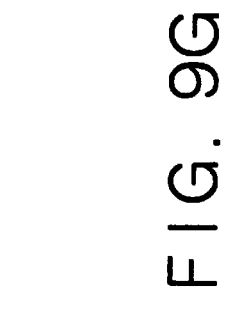
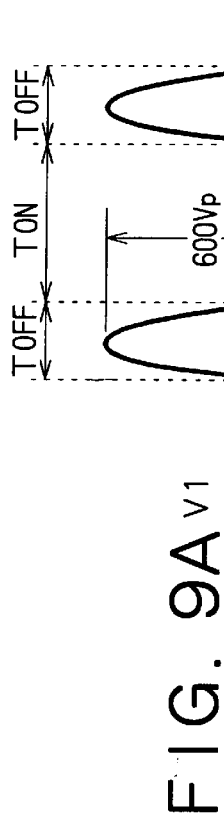
PRIOR ART
FIG. 9A V1
FIG. 9B ICP
FIG. 9C V2
FIG. 9D V3
FIG. 9E I3
FIG. 9F V5
FIG. 9G
FIG. 9H
FIG. 9I
FIG. 9J
FIG. 9K
FIG. 9L

US 6,456,509 B1

POWER LOSS OF SWITCHING POWER SUPPLY CIRCUIT FOR SUPPLYING CONSTANT VOLTAGE

BACKGROUND OF THE INVENTION

The present invention relates to a switching power supply circuit suitable for use in various video apparatus such as a color television receiver and a projector apparatus.

Some video apparatus such as a television receiver and a projector apparatus have an analog circuit and a digital circuit, for example, as circuit blocks for carrying out various signal processing.

Such video apparatus having the analog and digital circuit blocks are provided with a constant-voltage power supply for supplying constant operating voltage to the circuit blocks.

As an example of a conventional power supply circuit provided in such a video apparatus, FIG. 8 shows configuration of a switching power supply circuit provided in a large-sized color television receiver, for example.

A bridge rectifier circuit Di and a smoothing capacitor Ci in the power supply circuit generate a rectified and smoothed voltage Ei corresponding to an alternating input voltage VAC from a commercial alternating-current power.

A self-excited voltage resonance type converter that includes a switching device Q1 and performs switching operation by a so-called single-ended system is provided as a switching converter for interrupting the rectified and smoothed voltage Ei inputted thereto.

The switching device Q1 is driven by a selfoscillation driving circuit formed by a series connection circuit of a driving winding NB, a resonant capacitor CB, and a base current limiting resistance RB. Switching frequency of the switching device Q1 is determined by resonance frequency of a resonant circuit formed by the driving winding NB and the resonant capacitor CB.

A starting resistance RS is provided to supply the switching device Q1 with a starting current obtained in a rectifying and smoothing line at the turn-on of the commercial alternating-current power.

The switching device Q1 is connected with a clamp diode DD1 and a primary-side parallel resonant capacitor Cr shown in FIG. 8. Capacitance of the primary-side parallel resonant capacitor Cr and leakage inductance L1 of the primary winding N1 side of an isolating converter transformer PIT form a primary-side parallel resonant circuit of the voltage resonance type converter.

An orthogonal type control transformer PRT-1 is a saturable reactor provided with a resonance current detecting winding ND, the driving winding NB, and a control winding NC1. The orthogonal type control transformer PRT-1 is provided to drive the switching device Q1 and effect control for constant voltage.

The isolating converter transformer PIT (Power Isolation Transformer) transmits switching output of the switching device Q1 to the secondary side of the switching power supply circuit.

As shown in FIG. 8, a secondary-side winding is formed on the secondary side of the isolating converter transformer PIT by winding secondary windings N2, N3, N4, and N5.

In this case, as shown in FIG. 8, a point of connection between the secondary winding N4 and the secondary winding N5 is connected to a secondary-side ground. A secondary-side parallel resonant capacitor C2 is connected between the secondary-side ground and an ending point of the secondary winding N2 in parallel with the secondary-side winding.

The parallel resonant circuit to convert switching operation into voltage resonance type operation is provided on the primary side of the isolating converter transformer PIT, and the voltage resonant circuit to provide voltage resonance operation is provided on the secondary side of the isolating converter transformer PIT. In the present specification, the switching converter provided with such resonant circuits on the primary side and the secondary side is referred to as a "complex resonance type switching converter."

The secondary winding connected in parallel with the secondary-side parallel resonant capacitor C2 is provided with a half-wave rectifying and smoothing circuit formed by a rectifier diode D01 and a smoothing capacitor C01, so that a direct-current output voltage E01 of 135 V for horizontal deflection is obtained from the half-wave rectifying and smoothing circuit.

Also, the secondary winding formed by the secondary windings N3 and N4 is provided with a half-wave rectifying and smoothing circuit formed by a rectifier diode D02 and a smoothing capacitor C02, so that a direct-current output voltage E02 of 15 V for vertical deflection is obtained from the half-wave rectifying and smoothing circuit. The secondary winding N5 is connected with a rectifier diode D03 and a smoothing capacitor C03 shown in FIG. 8, so that a direct-current output voltage E03 of −15 V for the same vertical deflection is obtained from a half-wave rectifying and smoothing circuit formed by the rectifier diode D03 and the smoothing capacitor C03.

Thus, the direct-current output voltages E02 and E03 (±15 V) for vertical deflection are obtained from voltages induced in the secondary winding (N3+N4) and the secondary winding N5 on the secondary side of the isolating converter transformer PIT. Hence, the secondary winding (N3+N4) and the secondary winding N5 have the same number of turns.

In this case, the secondary-side direct-current output voltage E01 is also inputted from a branch point to a control circuit 1.

The control circuit 1 uses the direct-current output voltage E02 as its operating voltage. The control circuit 1 variably controls the inductance LB of the driving winding NB wound in the orthogonal type control transformer PRT-1 by changing the level of a control current flowing through the control winding NC1 according to change in the level of the direct-current output voltage E01. This results in a change in resonance conditions of the resonant circuit including the inductance LB of the driving winding NB in the self-oscillation driving circuit. This represents an operation of changing the switching frequency of the switching device Q1. This operation makes constant the direct-current output voltages outputted from the secondary side of the isolating converter transformer PIT.

Even with such a configuration for constant-voltage control including the orthogonal type control transformer PRT-1, since the primary-side switching converter is of the voltage resonance type, it may be considered that the power supply circuit variably controls the switching frequency of the switching device Q1 and at the same time, effects PWM control of the switching device Q1 within a switching cycle. This complex control operation is realized by a single control circuit system.

In addition, a direct-current output voltage E04 of 9 V to be supplied to the analog circuit block is obtained from output of the secondary winding (N3+N4) in the power supply circuit, and also a direct-current output voltage E05 of 5 V to be supplied to the digital circuit block is obtained from output of the secondary winding N4.

In this case, the output of the secondary winding (N3+N4) is inputted to a half-wave rectifying and smoothing circuit formed by a rectifier diode D04 and a smoothing capacitor C04 via an inductor L21 (4.7 μH) to reduce power loss. The half-wave rectifying and smoothing circuit first converts the output of the secondary winding (N3+N4) into a direct-current output voltage E07 of 11 V. Then, the direct-current output voltage E04 of 9 V to be outputted to the analog circuit block is obtained from the direct-current output voltage E07.

The output of the secondary winding N4 is inputted to a half-wave rectifying and smoothing circuit formed by a rectifier diode D05 and a smoothing capacitor C05. The half-wave rectifying and smoothing circuit converts the output of the secondary winding N4 into a direct-current output voltage E08 of 6.5 V. Then, the direct-current output voltages E05 (5 V) and E06 (3.3 V) to be outputted to the digital circuit block are obtained from the direct-current output voltage E08.

The direct-current output voltages E04 to E06 to be supplied to the analog and digital circuit blocks need to be made constant so that variations in the voltages fall within a range of ±2%.

However, even in the switching power supply circuit employing a complex control method, the level of the direct-current output voltages outputted from the secondary side is varied, though slightly, according to variation in secondary-side load power Po.

For example, as shown in FIG. 10, as the secondary-side load power Po is decreased, the voltage level of the direct-current output voltages E02 (15 V) and E08 (6.5 V) is lowered, though slightly.

Thus, the power supply circuit shown in FIG. 8 is provided with a constant-voltage circuit to obtain a constant direct-current output voltage E04 (9 V) whose variation is within a range of ±2% from the direct-current output voltage E07 (11 V) and a constant-voltage circuit to obtain constant direct-current output voltages E05 (5 V) and E06 (3.3 V) whose variation is also within a range of ±2% from the direct-current output voltage E08 (6.5 V).

When output current of a constant-voltage circuit is less than 2 A, for example, the constant-voltage circuit is formed by using a three-terminal series regulator IC. When the output current is more than 2 A, the constant-voltage circuit is formed by a step-down type converter using a chopper regulator IC.

In the case of the power supply circuit, the maximum rating of the direct-current output voltage E04 is 9 V/1.5 A, and the output current is less than 2 A. Thus, the constant-voltage circuit for providing the direct-current output voltage E04 is formed by a three-terminal series regulator IC-1 and a smoothing capacitor C041 to thereby provide the direct-current output voltage E04 of 9 V which is made constant within a range of ±2%.

The maximum rating of the direct-current output voltage E05 is 5 V/1.5 A, and the output current is less than 2 A. Thus, also in this case, the constant-voltage circuit formed by a three-terminal series regulator IC-2 and a smoothing capacitor C051 provides the direct-current output voltage E05 of 5 V which is made constant within a range of ±2%.

On the other hand, the maximum rating of the direct-current output voltage E06 is 3.3 V/3 A, and the output current is more than 2 A. Thus, the direct-current output voltage E08 in this case is inputted via a ferrite-bead inductor FB to a DC-DC converter 11 formed by a PWM control type step-down chopper circuit. The DC-DC converter 11 provides the direct-current output voltage E06 (3.3 V±0.07 V) which is made constant within a range of ±2%.

The DC-DC converter 11 is formed by a chopper regulator IC-3, a flywheel diode D11, and an inductor L22 (20 μH). The DC-DC converter 11 controls its switching operation by feeding back an output voltage outputted via the inductor L22 to the chopper regulator IC to thereby render the level of the output voltage constant.

However, the DC-DC converter 11 exhibits a rectangular waveform in the switching operation, thus causing a high level of noise in the switching operation.

Therefore, the switching noise caused in the switching operation is suppressed by the ferrite-bead inductor FB provided in a stage preceding the chopper regulator IC-3 and a ceramic capacitor Cn provided in a stage succeeding the chopper regulator IC-3.

The direct-current output voltage of the DC-DC converter 11 includes a harmonic ripple voltage component. Therefore, a pi filter circuit 12 formed by electrolytic capacitors C061 and C062 and an inductor L23 (3.3 μH) is provided in the output voltage line to eliminate the high-frequency ripple voltage component.

FIGS. 9A to 9L show operating waveforms of the power supply circuit shown in FIG. 8.

FIGS. 9A to 9F show operating waveforms under conditions where the direct-current output voltages E04 to E06 are made constant so that variations in the voltages fall within a range of ±2%, and a total load power of the direct-current output voltages E01 to E06 is 200 W. FIGS. 9G to 9L show operating waveforms under conditions where a total load power of the direct-current output voltages E01 to E06 is 100 W.

When the total load power is 200 W, the switching frequency of the switching device Q1 is controlled to be 71.4 kHz, for example, and the on/off period TON/TOFF of the switching device Q1 is 10 μs/4 μs.

A resonance voltage V1 generated across the primary-side parallel resonant capacitor Cr by the on/off operation of the switching device Q1 is as shown in FIG. 9A, and forms a sinusoidal pulse waveform during the period TOFF during which the switching device Q1 is turned off.

In the meantime, a collector current ICP as shown in FIG. 9B flows through the switching device Q1.

At the turn-on of the switching device Q1, a damper current (negative direction) flows through the clamp diode DD1 and the base and collector of the switching device Q1. The damper current period (0.5 μs) during which the damper current flows is a ZVS (Zero Volt Switching) region, and the switching device Q1 is turned on in the ZVS region.

As a result of such switching operation, a voltage V2 generated across the secondary-side parallel resonant capacitor C2 provided on the secondary side of the isolating converter transformer PIT has a resonance waveform as shown in FIG. 9C.

A voltage V3 generated across the secondary winding (N3+N4) has a resonance waveform as shown in FIG. 9D. An output current I3 as shown in FIG. 9E flows from the secondary winding (N3+N4).

A voltage V5 generated across the secondary winding N5 has a resonance waveform as shown in FIG. 9F.

When the total load power is 100 W, the switching frequency of the switching device Q1 is controlled to be 100 kHz, for example, and the on/off period TON/TOFF of the switching device Q1 is 6 μs/4 μs. In this case, a resonance voltage V1 as shown in FIG. 9G is generated across the primary-side parallel resonant capacitor Cr, and a collector current ICP as shown in FIG. 9H flows through the switching device Q1.

Also in this case, as a result of the switching operation of the switching device Q1, a voltage V2 generated across the secondary-side parallel resonant capacitor C2 has a resonance waveform as shown in FIG. 9I. A voltage V3 generated across the secondary winding (N3+N4) has a resonance waveform as shown in FIG. 9J. A current I3 as shown in FIG. 9K flows from the ending point of the secondary winding N3.

Similarly, a voltage V5 generated across the secondary winding N5 has a resonance waveform as shown in FIG. 9L.

SUMMARY OF THE INVENTION

The power supply circuit shown in FIG. 8 has the three-terminal series regulators IC-1 and IC-2 and the DC-DC converter formed with the chopper regulator IC-3 as the constant-voltage circuits for providing constant direct-current output voltages E04 to E06 whose variations are controlled to within a range of ±2%. The regulators IC-1 and IC-2 and the DC-DC converter 11 cause power loss.

For example, a power loss of about 3 W occurs in the three-terminal series regulator IC-1 for providing the direct-current output voltage E04. A power loss of about 2.3 W occurs in the three-terminal series regulator IC-2 for providing the direct-current output voltage E05.

Since the DC-DC power conversion efficiency of the DC-DC converter 11 for providing the direct-current output voltage E06 is about 90%, a power loss of about 1.2 W occurs in the DC-DC converter 11.

Hence, when supplying the direct-current output voltages E04 to E06, the power supply circuit shown in FIG. 8 causes a total power loss of about 6.5 W.

In addition, radiators need to be attached to the three-terminal series regulators IC-1 and IC-2, and also the DC-DC converter 11 needs to be provided with the ferrite-bead inductor FB and the ceramic capacitor Cn as components for suppressing the switching noise caused by the switching operation. Thus, the power supply circuit shown in FIG. 8 has a disadvantage of its parts cost being increased with the increase in the number of parts.

Accordingly, in view of the above problems, a switching power supply circuit according to the present invention is comprised as follows.

To achieve the above object, according to a first aspect of the present invention, there is provided a switching power supply circuit, including: a switching means including a switching device for intermittently outputting a direct-current input voltage inputted thereto; an isolating converter transformer including a primary winding and at least first and second secondary windings, the isolating converter transformer being adapted to transmit an output, obtained in the primary winding, of the switching means to the secondary windings and to have a desired degree of coupling to loosely couple the primary winding and the secondary windings to each other; a primary-side parallel resonant circuit formed by the primary winding and a primary-side parallel resonant capacitor, the resonant circuit being provided for converting operation of the switching means into voltage resonance type operation; a secondary-side resonant circuit formed by connecting a secondary-side resonant capacitor to the first secondary winding; a first direct-current output voltage generating means formed by including the secondary-side parallel resonant circuit and adapted to supply a first direct-current output voltage by performing rectifying operation on an alternating voltage obtained from the first secondary winding; a second direct-current output voltage generating means provided with a rectifier circuit for performing rectifying operation on an alternating voltage obtained from the second secondary winding and adapted to supply a second direct-current output voltage; and a constant-voltage control means including a capacitor disposed between a secondary-side reference ground and an anode of a rectifier diode forming the rectifier circuit provided for supplying the second direct-current output voltage; and an active clamp circuit formed by connecting at least a clamp capacitor and an auxiliary switching device in series and disposed in parallel with the capacitor, the constant-voltage control means being adapted to effect constant-voltage control on the second direct-current output voltage by controlling a conduction angle of the auxiliary switching device according to a level of the second direct-current output voltage.

According to a second aspect of the present invention, there is provided a switching power supply circuit, including: a switching means including a switching device for intermittently outputting a direct-current input voltage inputted thereto; an isolating converter transformer including a primary winding and at least first and second secondary windings, the isolating converter transformer being adapted to transmit an output, obtained in the primary winding, of the switching means to the first and second secondary windings and to have a desired degree of coupling to loosely couple the primary winding and the first and second secondary windings to each other; a primary-side parallel resonant circuit formed by the primary winding and a primary-side parallel resonant capacitor, the resonant circuit being provided for converting operation of the switching means into voltage resonance type operation; a secondary-side resonant circuit formed by connecting a secondary-side resonant capacitor to the first secondary winding; a first direct-current output voltage generating means formed by including the secondary-side parallel resonant circuit and adapted to supply a first direct-current output voltage by performing rectifying operation on an alternating voltage obtained from the first secondary winding; a second direct-current output voltage generating means provided with a rectifier circuit for performing rectifying operation on an alternating voltage obtained from the second secondary winding and adapted to supply a second direct-current output voltage; a third direct-current output voltage generating means provided with a rectifier circuit for branching and rectifying an alternating voltage obtained from the second secondary winding and adapted to supply at least a third direct-current output voltage; and a constant-voltage control means including a capacitor disposed between a secondary-side reference ground and an anode of a rectifier diode forming the rectifier circuit provided for supplying the third direct-current output voltage; and an active clamp circuit formed by connecting at least a clamp capacitor and an auxiliary switching device in series and disposed in parallel with the capacitor, the constant-voltage control means being adapted to effect constant-voltage control on the third direct-current output voltage by controlling a conduction angle of the auxiliary switching device according to a level of the third direct-current output voltage.

BRIEF DESCRIPTION OF THE DRAWINGS

FIG. 3 is a sectional view of a structure of an isolating converter transformer in FIG. 1;

FIGS. 4A and 4B are diagrams of assistance in explaining operations when mutual inductance in FIG. 3 is +M and −M;

FIGS. 5A to 5J are waveform diagrams showing operations of main parts of the power supply circuit shown in FIG. 1;

FIGS. 9A to 9L are waveform diagrams showing operations of main parts of the conventional power supply circuit shown in FIG. 8.

DETAILED DESCRIPTION OF THE INVENTION

Figure 1:
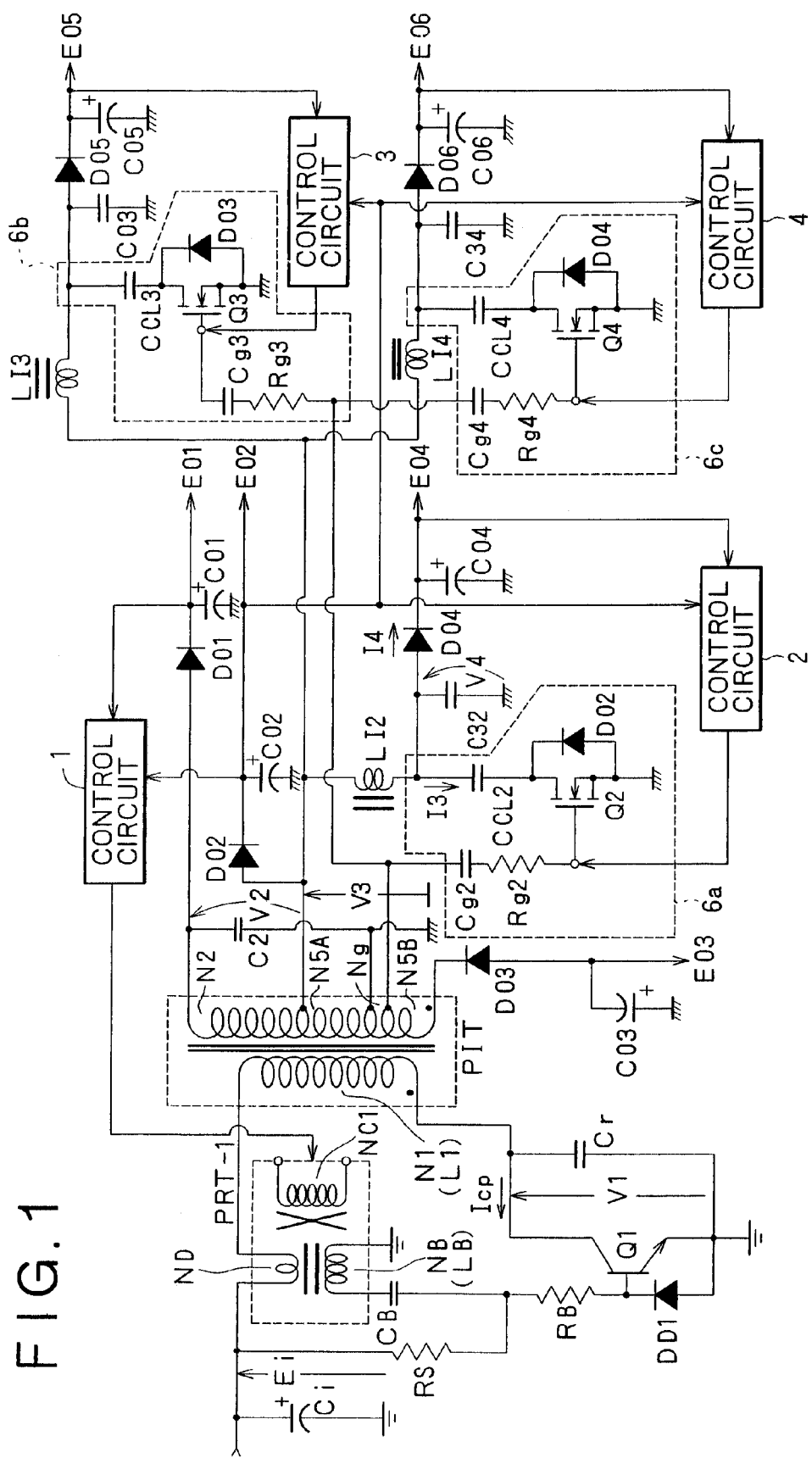
FIG. 1 shows a configuration of a power supply circuit according to a first embodiment of the present invention.

FIG. 1 is a circuit diagram showing a configuration of a switching power supply circuit according to an embodiment of the present invention.

The power supply circuit shown in FIG. 1 has a configuration of a complex resonance type switching converter provided with a voltage resonance type converter on the primary side and a parallel resonant circuit on the secondary side.

The power supply circuit shown in FIG. 1 is supplied with a direct-current input voltage Ei obtained by smoothing an input voltage inputted from for example a commercial alternating-current power supply via a bridge rectifier circuit not shown in the figure by a smoothing capacitor Ci.

The voltage resonance type converter that includes a switching device Q1 and performs self-excited switching operation by a so-called single-ended system is provided as a switching converter for interrupting the direct-current input voltage Ei inputted thereto. In this case, a high voltage bipolar transistor (Bipolar Junction Transistor) is employed as the switching device Q1.

A base of the switching device Q1 is connected to the positive electrode side of the smoothing capacitor Ci via a base current limiting resistance RB and a starting resistance RS. An emitter of the switching device Q1 is connected to a primary-side ground.

Connected between the base of the switching device Q1 and the primary-side ground is a series resonant circuit for self-oscillation driving that is formed by connecting a driving winding NB, a resonant capacitor CB, and the base current limiting resistance RB in series with each other.

A clamp diode DD1 inserted between the base of the switching device Q1 and a negative electrode of the smoothing capacitor Ci (primary-side ground) forms a path of a clamp current that flows during an off period of the switching device Q1.

A collector of the switching device Q1 is connected to one end of a primary-side winding N1 formed on the primary side of an isolating converter transformer PIT, while the emitter of the switching device Q1 is grounded.

A primary-side parallel resonant capacitor Cr is connected in parallel with the collector and emitter of the switching device Q1. Capacitance of the primary-side parallel resonant capacitor Cr and leakage inductance L1 of the primary-side winding N1 form a primary-side parallel resonant circuit of the voltage resonance type converter.

Though not described in detail, during the off period of the switching device Q1, a voltage V1 generated across the primary-side resonant capacitor Cr by the effect of the primary-side parallel resonant circuit practically forms a sinusoidal pulse waveform, and thus a voltage resonance type operation is obtained.

Figure 2A:
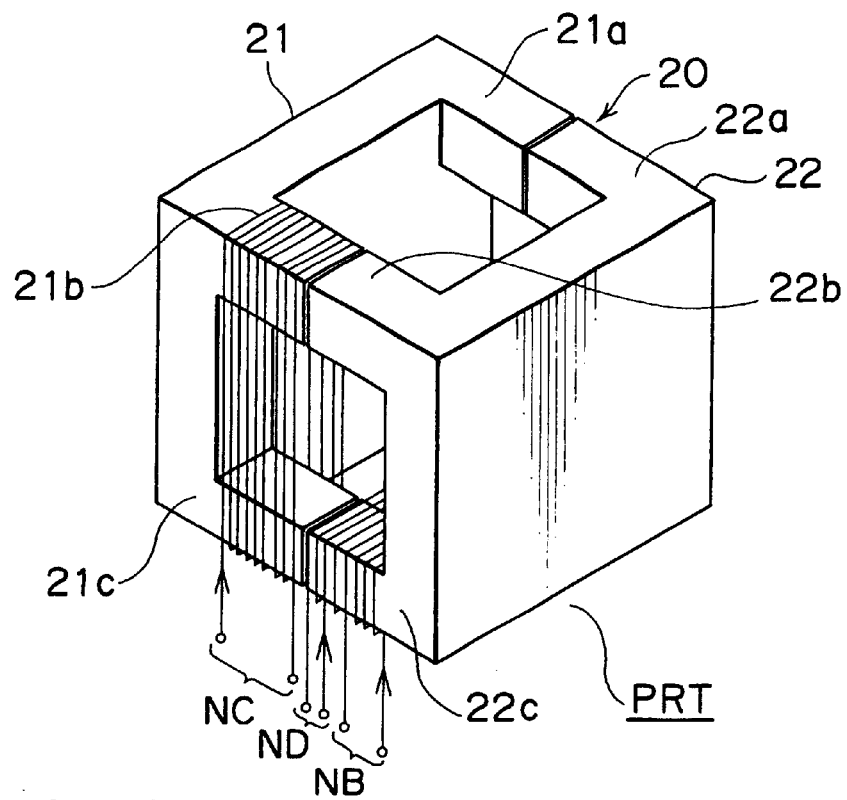
FIGS. 2A and 2B are sectional views of a structure of an orthogonal type control transformer in FIG. 1.
Figure 2B:
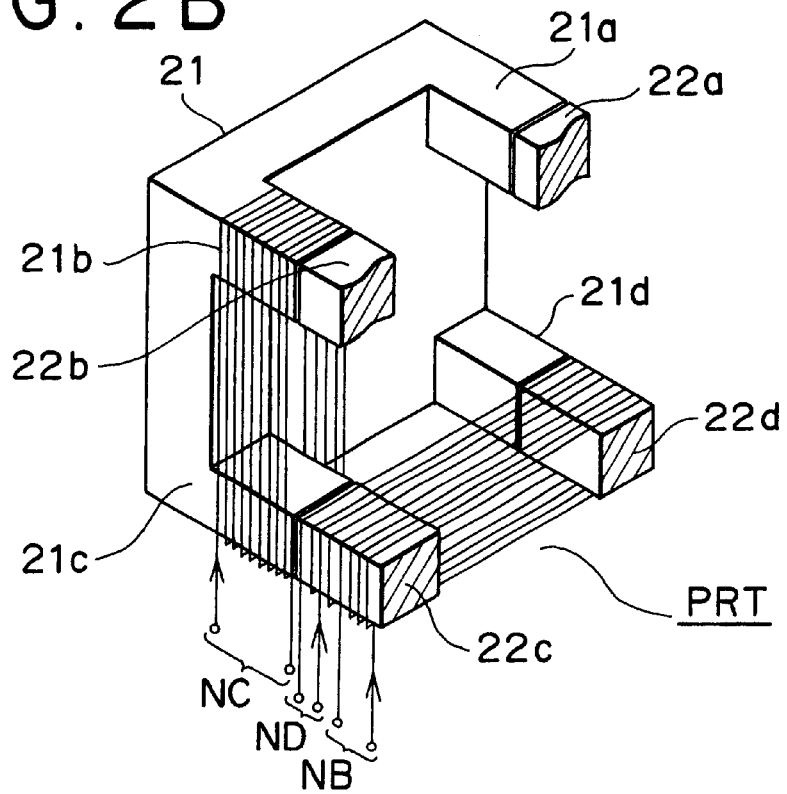

An orthogonal type control transformer PRT-1 shown in FIGS. 2A and 2B is a saturable reactor provided with a resonance current detecting winding ND, the driving winding NB, and a control winding NC1. The orthogonal type control transformer PRT-1 is provided to drive the switching device Q1 and effect control for constant voltage.

As shown in FIGS. 2A and 2B, the structure of the orthogonal type control transformer PRT-1 is a cubic core formed by connecting two double-U-shaped cores each having four magnetic legs with each other at ends of the magnetic legs. The resonance current detecting winding ND and the driving winding NB are wound around two given magnetic legs of the cubic core in the same winding direction, and the control winding NC1 is wound in a direction orthogonal to the resonance current detecting winding ND and the driving winding NB.

In this case, the resonance current detecting winding ND of the orthogonal type control transformer PRT-1 is inserted in series between the positive electrode of the smoothing capacitor Ci and the primary-side winding N1, so that the switching output of the switching device Q1 is transmitted to the resonance current detecting winding ND via the primary-side winding N1.

The switching output obtained by the resonance current detecting winding ND is induced in the driving winding NB via transformer coupling, whereby an alternating voltage is generated as driving voltage in the driving winding NB.

The driving voltage is outputted as driving current from a series resonant circuit of NB and CB, which forms the self-oscillation driving circuit, to the base of the switching device Q1 via the base current limiting resistance RB.

Thus, the switching device Q1 performs switching operation at a switching frequency determined by the resonance frequency of the series resonant circuit.

The isolating converter transformer PIT transmits the switching output of the switching device Q1 to the secondary side of the switching power supply circuit.

As shown in FIG. 3, the isolating converter transformer PIT has an E-E-shaped core formed by combining E-shaped cores CR1 and CR2 made for example of a ferrite material in such a manner that magnetic legs of the core CR1 are opposed to magnetic legs of the core CR2. The primary-side winding N1 and a secondary-side winding N2 are wound around a central magnetic leg of the E-E-shaped core in a state of being divided from each other by a dividing bobbin B. Also, a gap G is formed in the central magnetic leg, as shown in FIG. 3, by making the central magnetic leg of each of the E-shaped cores CR1 and CR2 shorter than two outer magnetic legs of each of the E-shaped cores CR1 and CR2. Thus, loose coupling at a desired coupling coefficient, for example 0.85, is provided, and accordingly a saturated state is not readily obtained.

When the gap G is not provided in the isolating converter transformer PIT, it is highly likely that the isolating converter transformer PIT reaches a saturation state in flyback operation and performs abnormal operation. Therefore it is difficult to expect that rectifying operation on the secondary side will be properly performed.

As for secondary-side operation of the isolating converter transformer PIT, mutual inductance M between the inductance LI of the primary-side winding N1 and inductance L2 of the secondary-side winding N2 provides +M operation mode (additive polarity mode; forward operation) or −M operation mode (subtractive polarity mode; flyback operation), depending on polarity (winding direction) of the primary-side winding N1 and the secondary-side winding N2, a connecting relation of a rectifier diode D0, and change in polarity of the alternating voltage induced in the secondary-side winding. For example, an equivalent of a circuit shown in FIG. 4A has a mutual inductance of +M, while an equivalent of a circuit shown in FIG. 4B has a mutual inductance of −M.

During a period in +M operation mode provided by the polarity of the primary-side winding N1 and the secondary-side winding N2, N5A and N5B of the isolating converter transformer PIT, the power supply circuit shown in FIG. 1 charges smoothing capacitors C01 to C03 via rectifier diodes D01 to D03, respectively.

As shown in FIG. 1, on the secondary side of the isolating converter transformer PIT, the secondary-side winding is formed by winding a secondary winding N2, or a first secondary winding, and secondary windings N5A and N5B, or a second secondary winding.

In this case, as shown in FIG. 1, a tap provided between the secondary winding N5A and the secondary winding N5B is connected to a secondary-side ground. A secondary-side parallel resonant capacitor C2 is connected between the secondary-side ground and an ending point of the secondary winding N2.

Thus, the secondary-side parallel resonant capacitor C2 is connected in parallel with the secondary winding (N2+N5A).

In this case, leakage inductance (L2+L5A) of the secondary winding (N2+N5A) and capacitance of the secondary-side parallel resonant capacitor C2 form a secondary-side parallel resonant circuit on the secondary side of the isolating converter transformer PIT.

Thus, a voltage resonance operation is obtained on the secondary side of the isolating converter transformer PIT, and therefore an alternating voltage induced on the secondary side of the isolating converter transformer PIT is converted into a resonance voltage waveform.

The secondary winding (N2+N5A) is provided with a half-wave rectifying and smoothing circuit formed by the rectifier diode D01 and the smoothing capacitor C01, so that a direct-current output voltage E01 of 135 V for h horizontal deflection is obtained from the half-wave rectifying and smoothing circuit. The secondary winding N5A is provided with a half-wave rectifying and smoothing circuit formed by the rectifier diode D02 and the smoothing capacitor C02, so that a direct-current output voltage E02 of 15 V for vertical deflection is obtained from the half-wave rectifying and smoothing circuit.

In addition, the secondary winding N5B is provided with a half-wave rectifying and smoothing circuit formed by the rectifier diode D03 and the smoothing capacitor C03.

In this case, a cathode of the rectifier diode D03 is connected to a starting point of the secondary winding N5B, and an anode of the rectifier diode D03 is connected to the negative electrode side of the smoothing capacitor C03, whereby a negative-level direct-current output voltage E03 of −15 V for vertical deflection is obtained from the secondary winding N5B.

Thus, the direct-current output voltages E02 and E03 (±15 V) for vertical deflection are obtained from the voltages induced in the secondary windings N5A and N5B on the secondary side of the isolating converter transformer PIT. In this case, the secondary windings NSA and N5B have the same number of turns.

Thus, the power supply circuit shown in FIG. 1 is formed by the complex resonance type switching converter provided with the primary-side parallel resonant circuit for converting the switching operation into voltage resonance type operation on the primary side and the secondary-side parallel resonant circuit for providing voltage resonance operation on the secondary side.

The direct-current output voltage E01 is also inputted from a branch point to a control circuit 1. The control circuit 1 is formed by for example an error amplifier and the like, and uses the direct-current output voltage E02 (15 V) as its operating voltage. The control circuit 1 variably controls the inductance LB of the driving winding NB wound in the orthogonal type control transformer PRT-1 by changing the level of a control current flowing through the control winding NC1 of the orthogonal type control transformer PRT-1 according to change in the level of the direct-current output voltage EO1 outputted from the secondary side of the isolating converter transformer PIT. This results in a change in resonance conditions of the series resonant circuit including the inductance LB of the driving winding NB in the circuit for self-oscillation driving of the switching device Q1. This represents an operation of changing the switching frequency of the switching device Q1. This operation stabilizes the direct-current output voltages E01 to E03 outputted from the secondary side of the isolating converter transformer PIT, for example.

In a case where the orthogonal type control transformer PRT-1 variably controlling the inductance LB of the driving winding NB is provided as in the power supply circuit of the present embodiment shown in FIG. 1, in changing the switching frequency of the switching device Q1, a period TOFF during which the switching device Q1 is turned off is fixed, while a period TON during which the switching device Q1 is turned on is variably controlled. Specifically, the power supply circuit shown in FIG. 1 performs complex control operation in which the power supply circuit controls resonance impedance for switching output by variably controlling the switching frequency of the switching device Q1 as an operation for constant-voltage control, and at the same time, the power supply circuit effects PWM control of the switching device Q1 within a switching cycle.

The switching power supply circuit shown in FIG. 1 is further provided with three active clamp circuits 6a, 6b, and 6c enclosed by broken lines. In this case, as shown in the figure, an ending point of the secondary winding N5A is connected to the positive terminal side of parallel resonant capacitors C32, C33, and C34 via inductors L12, L13, and L14, and the active clamp circuits 6a, 6b, and 6c are connected in parallel with the parallel resonant capacitors C32 to C34, respectively.

The active clamp circuit 6a is formed with an auxiliary switching device Q2, a clamp capacitor CCL2, and a clamp diode DD2. A so-called body diode, for example, is selected for the clamp diode DD2.

A driving circuit system for driving the auxiliary switching device Q2 comprises a driving winding Ng, a capacitor Cg2, and a resistance Rg2.

The clamp diode DD2 is connected in parallel with a drain and source of the auxiliary switching device Q2. In this case, an anode of the clamp diode DD2 is connected to the source of the auxiliary switching device Q2, while a cathode of the clamp diode DD2 is connected to the drain of the auxiliary switching device Q2.

The drain of the auxiliary switching device Q2 is connected to one terminal of the clamp capacitor CCL2, whereas the other terminal of the clamp capacitor CCL2 is connected to a node that connects the inductor L12, the parallel resonant capacitor C32, and an anode of a rectifier diode D04 with each other. The source of the auxiliary switching device Q2 is connected to a secondary-side ground.

Thus, the active clamp circuit 6a is formed by connecting the clamp capacitor CCL2 in series with a parallel connection circuit of the auxiliary switching device Q2 and the clamp diode DD2. The circuit thus formed is connected in parallel with the parallel resonant capacitor C32.

Similarly, the active clamp circuit 6b is formed with an auxiliary switching device Q3, a clamp capacitor CCL3, and a clamp diode DD3. The active clamp circuit 6c is formed with an auxiliary switching device Q4, a clamp capacitor CCL4, and a clamp diode DD4.

The active clamp circuits 6b and 6c are connected in parallel with the parallel resonant capacitors C33 and C34, and control circuits 3 and 4 effect PWM control of the auxiliary switching devices Q3 and Q4 in the active clamp circuits 6b and 6c, respectively. Thus, it is possible to equivalently change capacitance of the parallel resonant capacitors C33 and C34 and thereby render direct-current output voltages E05 and E06 constant.

As shown in FIG. 1, gates of the auxiliary switching devices Q2 to Q4 are connected to, respectively, a series connection circuit of the resistance Rg2, the capacitor Cg2, and the driving winding Ng; a series connection circuit of a resistance Rg3, a capacitor Cg3, and the driving winding Ng; and a series connection circuit of a resistance Rg4, a capacitor Cg4, and the driving winding Ng, the series connection circuits respectively serving as the driving circuit systems for driving the auxiliary switching devices Q2 to Q4. The series connection circuits form self-oscillation driving circuits for driving the auxiliary switching devices Q2 to Q4. The series connection circuits are configured to ensure on/off operation of the auxiliary switching devices Q2 to Q4 when the rectifier diodes D04 to D06 do not conduct.

The driving winding Ng is formed by providing a tap to the secondary winding N5B, and the number of turns of the driving winding Ng in this case is 1T (turn), for example. It is to be noted that when the number of turns of the driving winding Ng is 1T, operation of the driving winding Ng is insured in practice; however, the number of turns is not limited to 1T.

The other end of the inductor L12 is connected to the anode of the rectifier diode D04 formed by a Schottky diode, for example. A half-wave rectifying and smoothing circuit formed by the rectifier diode D04 and a smoothing capacitor C04 supplies a direct-current output voltage E04 (second direct-current output voltage).

Similarly, the other end of the inductor L13 is connected to an anode of a rectifier diode D05 formed by a Schottky diode or the like. A half-wave rectifying and smoothing circuit formed by the rectifier diode D05 and a smoothing capacitor C05 supplies a direct-current output voltage E05 (third direct-current output voltage).

Also, the other end of the inductor L14 is connected to an anode of a rectifier diode D06 formed by a Schottky diode or the like. A half-wave rectifying and smoothing circuit formed by the rectifier diode D06 and a smoothing capacitor C06 supplies a direct-current output voltage E06 (fourth direct-current output voltage).

The direct-current output voltages E04 to E06 are also inputted from a branch point to control circuits 2, 3, and 4, respectively.

The control circuits 2 to 4 are also formed by for example an error amplifier such as a temperature-compensated shunt regulator, and the direct-current output voltage E02 is inputted to each of the control circuits 2 to 4 as its operating voltage.

The control circuit 2 effects PWM control of the auxiliary switching device Q2 in the active clamp circuit 6a according to change in the level of the direct-current output voltage E04. Such control operation can be considered an operation of equivalently changing capacitance of the parallel resonant capacitor C32. This operation controls a current I4 flowing to the rectifier diode D04 via the inductor L12, whereby the direct-current output voltage E04 is made constant within a range of 9 V±0.18 V for output.

Similarly, the control circuit 3 effects PWM control of the auxiliary switching device Q3 according to change in the level of the direct-current output voltage E05, and thereby equivalently changes capacitance of the parallel resonant capacitor C33. Thus, the control circuit 3 controls a current flowing to the rectifier diode D05 via the inductor L13, whereby the direct-current output voltage EOS is made constant within a range of 5 V±0.1 V for output.

Also, the control circuit 4 effects PWM control of the auxiliary switching device Q4 according to change in the level of the direct-current output voltage E06, and thereby equivalently changes capacitance of the parallel resonant capacitor C34. Thus, the control circuit 4 controls a current flowing to the rectifier diode D06 via the inductor L14, whereby the direct-current output voltage E06 is made constant within a range of 3.3 V±0.07 V for output.

According to experiments, when actually configuring the power supply circuit shown in FIG. 1, the following selections are made: the secondary-side parallel resonant capacitor C2=0.01 $\mu$F; the secondary winding N2 of the isolating converter transformer PIT=40 T; the secondary windings N5A and N5B=5 T; the driving winding Ng=1 T; the inductor L12=10 $\mu$H; L13=15 $\mu$H; L14=18$\mu$H; the parallel resonant capacitors C32 to C34=0.22 $\mu$F; the clamp capacitors CCL2 to CCL4=2.2 $\mu$F; the capacitors Cg2 to Cg4=0.39 $\mu$F; and the resistances Rg2 to Rg4=22$\Omega$. A MOS-FET of 10 A/50 V and an on resistance of 0.2 $\Omega$ is selected for the auxiliary switching devices Q2 to Q4.

While the power supply circuit shown in FIG. 1 supplies the direct-current output voltage E04 of 9 V as operating voltage for an analog IC, the power supply circuit can also supply a direct-current output voltage E04 of 12 V for the analog IC, instead of the direct-current output voltage E04 of 9 V, for example by providing a further active clamp circuit.

Similarly, the power supply circuit can also supply an operating voltage of 2.5 V for a digital IC.

As an example of operating waveforms of the switching power supply circuit shown in FIG. 1, FIG. 5 shows operating waveforms of the switching power supply circuit formed by the above-mentioned components.

FIGS. 5A to 5E show operating waveforms under conditions where the direct-current output voltages E04 to E06 are made constant so that variations in the voltages fall within a range of ±2%, and a total load power of the direct-current output voltages E01 to E06 is 200 W. FIGS. 5F to 5J show operating waveforms under conditions where a total load power of the direct-current output voltages E01 to E06 is 100 W.

When the total load power is 200 W, a resonance voltage V2 as shown in FIG. 5A is generated across the secondary-side parallel resonant capacitor C2 provided on the secondary side of the isolating converter transformer PIT, and a resonance voltage V3 as shown in FIG. 5B is obtained from the secondary winding N5A.

In this case, a current I3 as shown in FIG. 5D flows through the active clamp circuit 6a, a voltage V4 as shown in FIG. 5C is generated by the parallel resonant capacitor C32, and a current I4 having a resonance waveform as shown in FIG. 5E flows through the rectifier diode D04.

On the other hand, when the total load power is 100 W, a resonance voltage V2 as shown in FIG. 5F is generated across the secondary-side parallel resonant capacitor C2, and a resonance voltage V3 as shown in FIG. 5G is obtained from the secondary winding N5A.

In this case, a current I3 as shown in FIG. 5I flows through the active clamp circuit 6a, a voltage V4 as shown in FIG. 5H is generated by the parallel resonant capacitor C32, and a current I4 having a resonance waveform as shown in FIG. 5J flows through the rectifier diode D04.

A comparison of the operating waveforms shown in FIGS. 5A to 5E and the operating waveforms shown in FIGS. 5F to 5J shows that the cycle of the resonance voltage V2 obtained from the secondary side of the isolating converter transformer PIT, for example, is 6 μs/8 μs and 6 μs/5 μs. Therefore, it is indicated that switching operation of the switching device Q1 is controlled by the complex control method. It is also shown that the operating waveform of each part is a resonance waveform.

In addition, as is shown by the waveforms of the resonance voltage V4 shown in FIGS. 5C and 5H and the current I3 shown in FIGS. 5D and 5I, switching operation of the auxiliary switching device Q2 is ZVS, and therefore switching loss in the auxiliary switching device Q2 may be ignored.

Thus, the switching power supply circuit according to the present embodiment shown in FIG. 1 is formed by the complex resonance type switching converter, and provided with the active clamp circuits 6a to 6c to supply the direct-current output voltages E04 to E06 whose variations are within a range of ±2% from the secondary side of the isolating converter transformer PIT. The direct-current output voltages E04 to E06 are made constant by effecting PWM control of switching operation of the auxiliary switching devices Q2 to Q4 on the basis of change in the level of the direct-current output voltages E04 to E06, respectively.

In this case, power loss caused when the power supply circuit of FIG. 1 supplies the constant directcurrent output voltages E04 to E06 is primarily made up of switching loss in the auxiliary switching devices Q2 to Q4 provided in the active clamp circuits 6a to 6c and conduction loss in the clamp diodes DD2 to DD4 formed by a body diode. As described above, the switching operation of the auxiliary switching devices Q2 to Q4 is ZVS, and therefore switching loss in the auxiliary switching devices Q2 to Q4 is at a negligible level. Thus, the power loss caused in making the direct-current output voltages E04 to E06 constant is the conduction loss in the clamp diodes DD2 to DD4 in the active clamp circuits 6a to 6c.

Even if the switching loss in the auxiliary switching devices Q2 to Q4 is not ignored, the switching loss in each of the auxiliary switching devices Q2 to Q4 is about 0.2 W and the conduction loss in each of the clamp diodes DD2 to DD4 is about 0.4 W at a maximum load power, or the total load power of 200 W, for example, so that the power loss in each of the active clamp circuits 6a to 6c is about 0.6 W. The total power loss in the switching power supply circuit shown in FIG. 1 is about 2.1 W.

Figure 8:
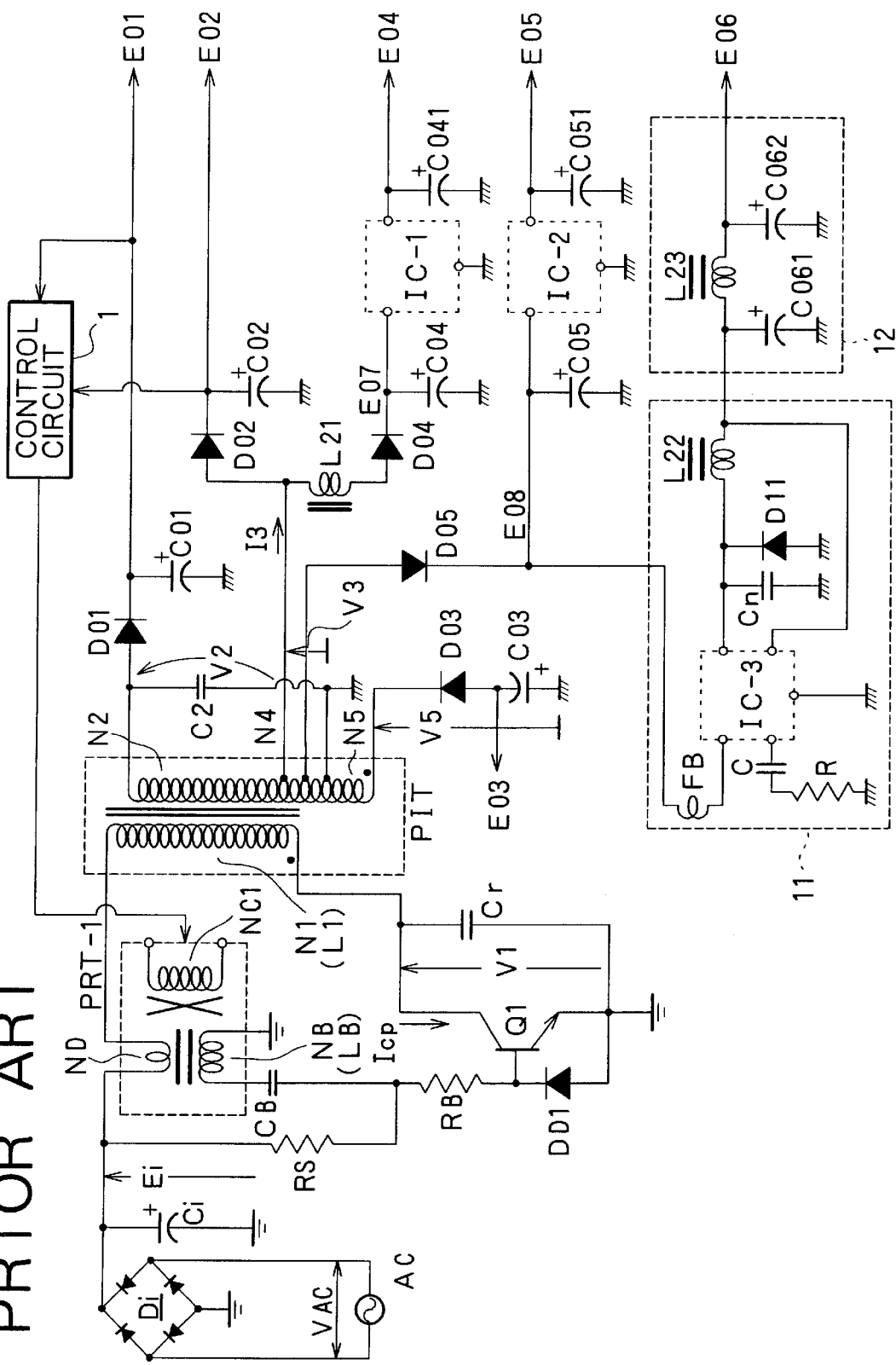
FIG. 8 shows a configuration of a conventional power supply circuit.
Figure 10:
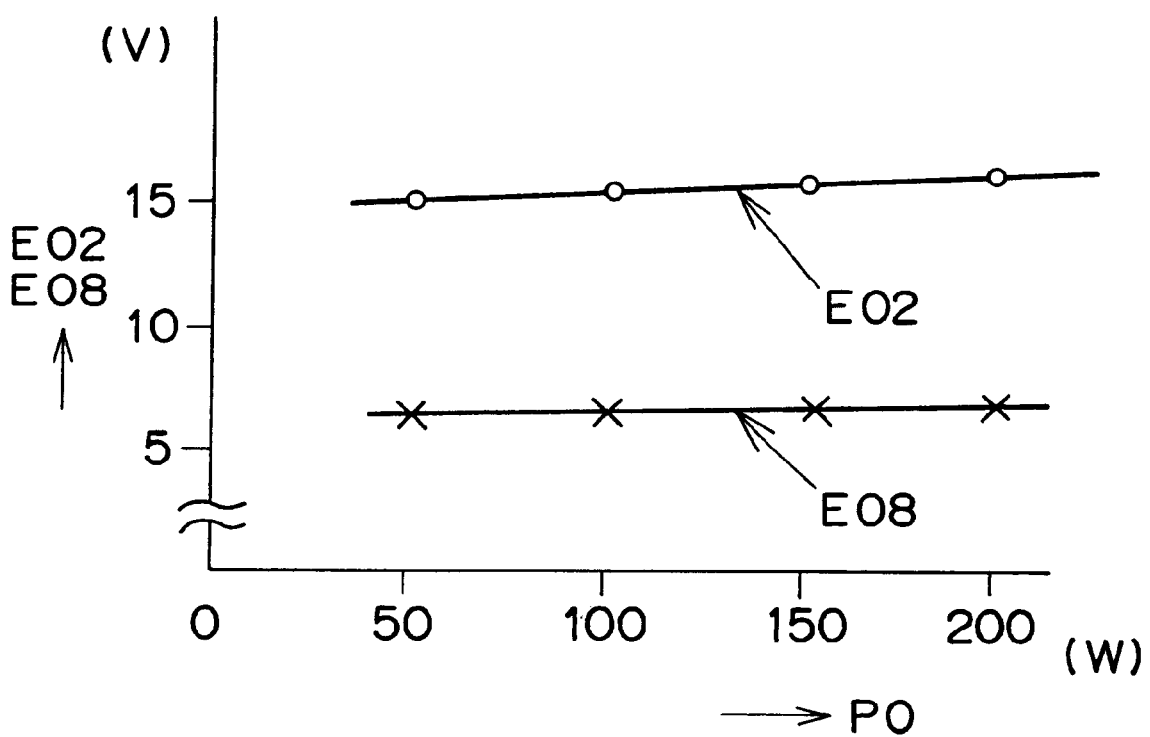
FIG. 10 shows variation in direct-current output voltage with respect to load power in the conventional power supply circuit shown in FIG. 8.

On the other hand, the power loss caused when the conventional power supply circuit of FIG. 8 supplies the constant direct-current output voltages E04 to E06 is about 6.5 W, as described earlier. Thus, with the power supply circuit of FIG. 1, it is possible to reduce the power loss by about 4.4 W.

When converting this into an alternating-current input power, it is a reduction of about 4.8 W, thus making it possible to save a corresponding amount of energy.

Moreover, the power supply circuit shown in FIG. 1 does not require the three-terminal series regulators for providing the direct-current output voltages E04 and E05, thus also eliminating the need for radiators to be attached to the three-terminal series regulators.

The DC-DC converter 11 for providing the direct-current output voltage E06 in the conventional power supply circuit shown in FIG. 8 has a rectangular operating waveform, thus causing switching noise in switching operation. The conventional power supply circuit shown in FIG. 8 therefore requires a component for suppressing the switching noise and a pi filter circuit for eliminating high-frequency ripple voltage.

On the other hand, the operating waveform of each part of the power supply circuit shown in FIG. 1 is a smooth resonance waveform, thereby making it possible to suppress switching noise in switching operation. Thus, the power supply circuit shown in FIG. 1 does not require a component for suppressing switching noise and a pi filter circuit for eliminating high-frequency ripple voltage.

Hence, while the conventional power supply circuit shown in FIG. 8 requires six smoothing electrolytic capacitors, the power supply circuit shown in FIG. 1 requires only three smoothing electrolytic capacitors, thereby making it possible to correspondingly reduce the number of parts and parts cost.

The power supply circuit according to the present invention is not limited to the circuit configuration shown in FIG. 1.

Figure 6:
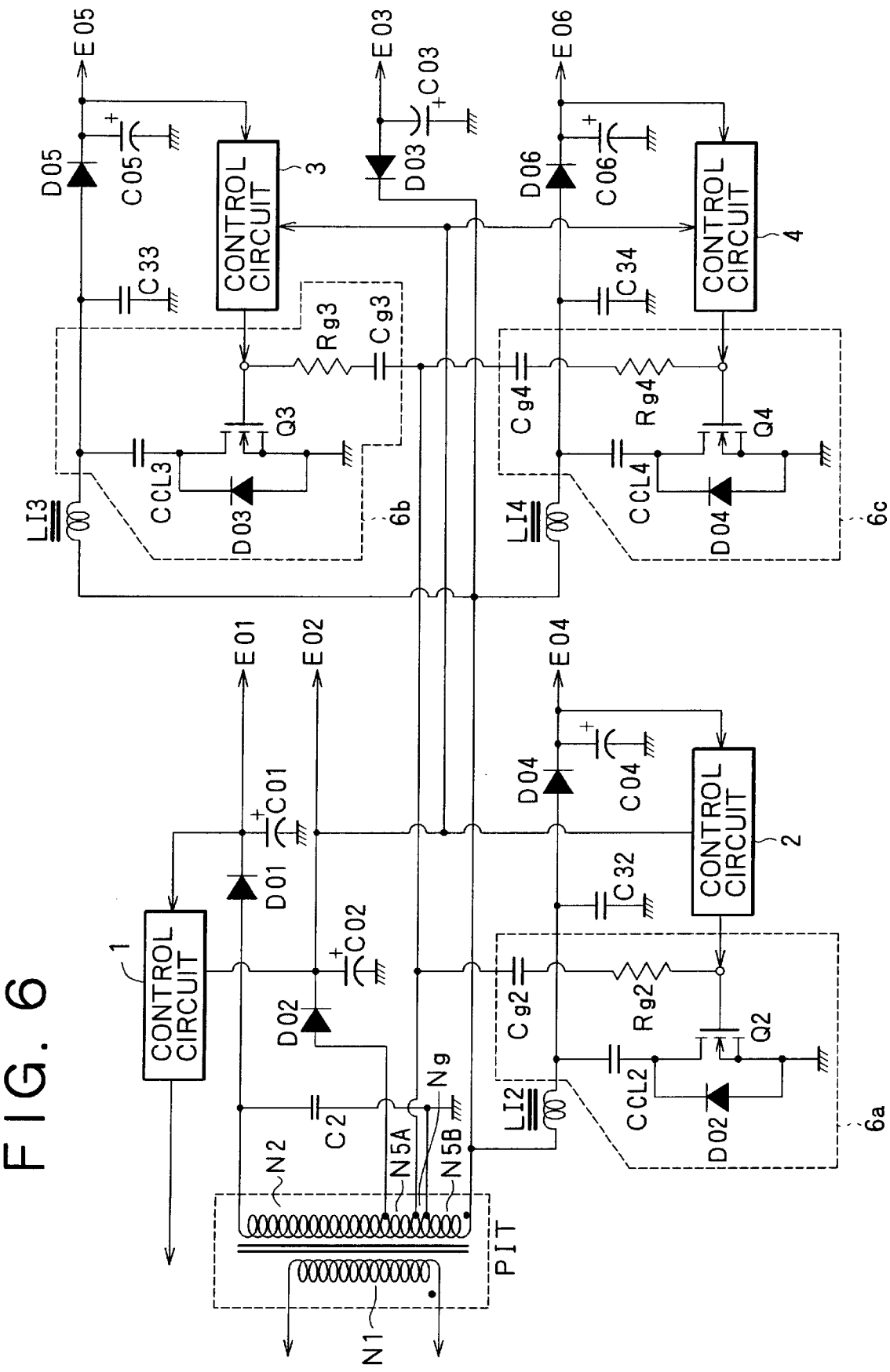
FIG. 6 shows a configuration of a power supply circuit according to a second embodiment of the present invention.

FIG. 6 shows a secondary-side configuration of a switching power supply circuit according to a second embodiment of the present invention. The same parts as in the power supply circuit of FIG. 1 are identified by the same reference numerals, and their description will be omitted. The configuration of a primary-side circuit is the same as that of the self-excited voltage resonance converter as shown in FIG. 1, and therefore is not shown in FIG. 6.

The positive electrode side of parallel resonant capacitors C32, C33, and C34 in the switching power supply circuit shown in FIG. 6 is connected to a starting point of a secondary winding N5B via inductors L12, L13, and L14, respectively. Active clamp circuits 6a, 6b, and 6c are connected in parallel with the parallel resonant capacitors C32 to C34, respectively. Thus, while the active clamp circuits 6a to 6c in the power supply circuit shown in FIG. 1 are connected to the secondary winding N5A, the active clamp circuits 6a to 6c in this case are connected to the secondary winding N5B.

Accordingly, when the switching power supply circuit shown in FIG. 6 employs the active clamp circuits 6a to 6c to make direct-current output voltages E04 to E06 constant as in the case of the switching power supply circuit shown in FIG. 1, it is possible to reduce power loss by about 4.4 W as compared with the conventional power supply circuit. When converting this into an alternating-current input power, it is a reduction of about 4.8 W, thus making it possible to save a corresponding amount of energy.

Also, since the power supply circuit in this case does not require three-terminal series regulators, the power supply circuit eliminates the need for radiators to be attached to the three-terminal series regulators and also the need for components for suppressing switching noise and high-frequency ripple voltage, thereby making it possible to correspondingly reduce the number of parts and parts cost.

It is to be noted that the configuration of the primary-side circuits of the power supply circuits according to the embodiments described thus far has been described by taking a self-excited voltage resonance converter as an example; however, it is a mere example and the present invention may be formed by an externally excited voltage resonance converter, for example.

Figure 7A:
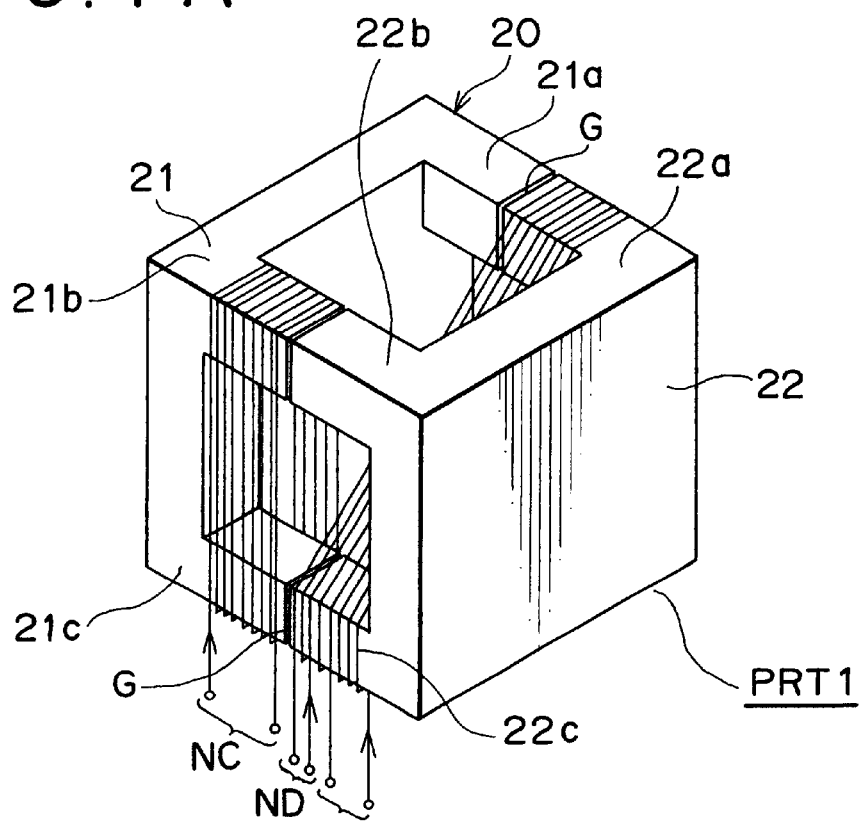
FIGS. 7A and 7B are sectional views of a structure of a control transformer in which a control winding and a driving winding are wound in obliquely crossing winding relation to each other.
Figure 7B:
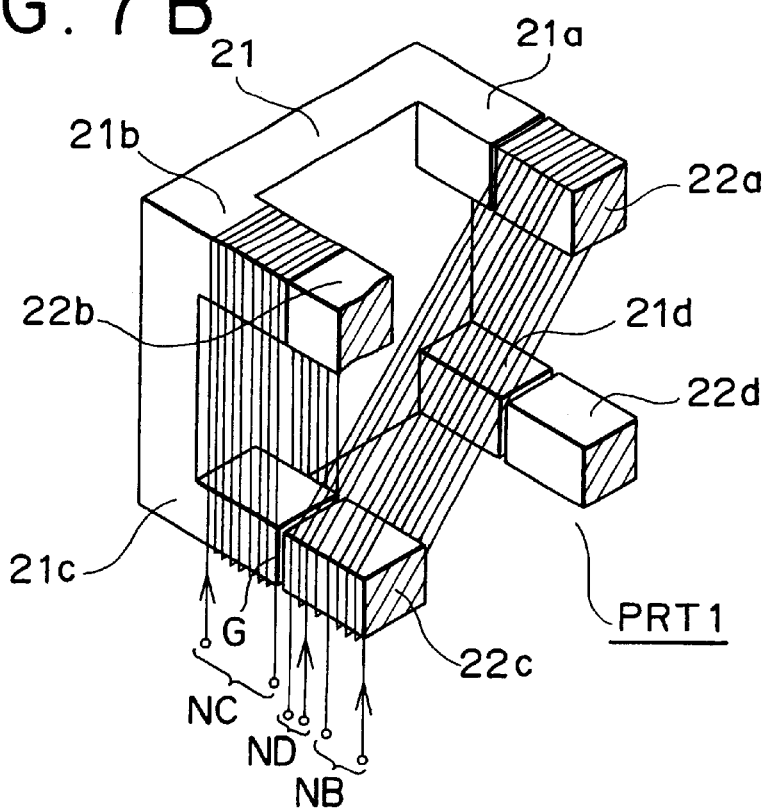

In the embodiments, the orthogonal type control transformer PRT is used as a control transformer to effect control for constant voltage in the circuit configuration provided with the self-excited resonance converter on the primary side; however, a control transformer shown in FIG. 7 may be employed instead of the orthogonal type control transformer PRT.

As shown in FIG. 7, the structure of the control transformer is a cubic core formed by combining two double U-shaped cores each having four magnetic legs with each other, for example, as in the case of the orthogonal type control transformer. A control winding NC1 and a driving winding NB are wound around the cubic core in obliquely crossing winding relation to each other. Specifically, either the control winding NC1 or the driving winding NB is wound around two adjacent magnetic legs of the four magnetic legs of the cubic core, and the other winding is wound around two magnetic legs situated in diagonal positional relation to each other.

The control transformer operates in such a manner that inductance of the driving winding is increased even when alternating current flowing through the driving winding is changed from a negative current level to a positive current level. Thus, the level of current in a negative direction for turning off the switching device is increased, and thereby storage time of the switching device is shortened. As a result of this, fall time of the switching device at turn-off is also shortened, thereby enabling further reduction of power loss in the switching device.

What is claimed is:

1. A switching power supply circuit, comprising:

switching means including a switching device for intermittently outputting a direct-current voltage inputted to said switching means;

an isolating converter transformer including a primary winding, a first secondary winding, and a second secondary winding, wherein said isolating converter transformer transmits said output of said switching means fed to said primary winding to said first and second secondary windings; and said isolating converter transformer has a desired degree of coupling for loosely coupling said primary winding and said first and second secondary windings;

a primary-side parallel resonant circuit formed by said primary winding and a primary-side parallel resonant capacitor for converting an operation of said switching means into a voltage-resonance type operation;

a secondary-side resonant circuit formed by connecting a secondary-side resonant capacitor to said first secondary winding;

first direct-current output voltage generating means including said secondary-side parallel resonant circuit for supplying a first direct-current output voltage by performing a rectifying operation on an alternating voltage obtained from said first secondary winding;

second direct-current output voltage generating means provided with a rectifier circuit for performing a rectifying operation on an alternating voltage obtained from said second secondary winding and for supplying a second direct-current output voltage; and constant-voltage control means including: a capacitor disposed between a secondary-side reference ground and an anode of a rectifier diode forming said rectifier circuit that supplies said second direct-current output voltage; and an active clamp circuit formed by connecting a clamp capacitor and an auxiliary switching device in series and disposed in parallel with said capacitor, said constant-voltage control means performing constant-voltage control on said second direct-current output voltage by controlling a conduction angle of said auxiliary switching device according to a level of said second direct-current output voltage.

2. A switching power supply circuit, comprising:

switching means including a switching device for intermittently outputting a direct-current voltage inputted to said switching means;

an isolating converter transformer including a primary winding, a first secondary winding and a second secondary winding, wherein said isolating converter transformer transmits said output of said switching means fed to said primary winding to said first and second secondary windings; and said isolating converter transformer has a desired degree of coupling for loosely coupling said primary winding and said first and second secondary windings;

a primary-side parallel resonant circuit formed by said primary winding and a primary-side parallel resonant capacitor for converting an operation of said switching means into a voltage-resonance type operation;

a secondary-side resonant circuit formed by connecting a secondary-side resonant capacitor to said first secondary winding;

first direct-current output voltage generating means including said secondary-side parallel resonant circuit for supplying a first direct-current output voltage by performing a rectifying operation on an alternating voltage obtained from said first secondary winding;

second direct-current output voltage generating means provided with a rectifier circuit for performing a rectifying operation on an alternating voltage obtained from said second secondary winding and for supplying a second direct-current output voltage;

third direct-current output voltage generating means provided with a rectifier circuit for branching and rectifying said alternating voltage obtained from said second secondary winding and for supplying a third direct-current output voltage; and constant-voltage control means including: a capacitor disposed between a secondary-side reference ground and an anode of a rectifier diode forming said rectifier circuit that supplies said third direct-current output voltage; and an active clamp circuit formed by connecting a clamp capacitor and an auxiliary switching device in series and disposed in parallel with said capacitor, said constant-voltage control means performing constant-voltage control on said third direct-current output voltage by controlling a conduction angle of said auxiliary switching device according to a level of said third direct-current output voltage.

3. The switching power supply circuit as claimed in claim 1 or claim 2, wherein said first secondary winding is formed by winding a wire of said second secondary winding.

4. The switching power supply circuit as claimed in claim 1 or claim 2, wherein said constant-voltage control means comprises first constant-voltage control means and further comprising second constant-voltage control means for performing control for constant voltage by driving said switching device such that a switching frequency of said switching device is controlled according a to level of said first direct-current output voltage, wherein an off period of said switching device within a switching cycle is fixed and an on period of said switching device is changed.

5. The switching power supply circuit as claimed in claim 4, wherein said second constant-voltage control means includes: a control transformer having a detecting winding connected in series with said primary winding of said isolating converter transformer for detecting a resonance current; a driving winding for driving said switching means; and a control winding wound in one of an orthogonal direction and an oblique direction with respect to said detecting and driving windings for changing an inductance of said driving winding by being changed in control current according to a level of said secondary-side direct-current output voltage, said second constant-voltage control means controlling said switching frequency of said switching device.

6. The switching power supply circuit as claimed in claim 1 or claim 2, wherein said auxiliary switching device is driven by a self-oscillation driving circuit formed by connecting a driving winding formed by providing a tap to said secondary winding and a capacitor in series.

* * * * *